United States Patent [19]

Wareham et al.

[11] Patent Number: 4,707,169
[45] Date of Patent: Nov. 17, 1987

[54] CORD DUMP AND BAG TENSIONING CAP

[75] Inventors: Richard A. Wareham, North Canton; Dean H. Buchtel, Canton, both of Ohio

[73] Assignee: The Hoover Company, North Canton, Ohio

[21] Appl. No.: 917,901

[22] Filed: Oct. 10, 1986

[51] Int. Cl.$^4$ ............................................. B01D 46/02
[52] U.S. Cl. ........................................ 55/357; 15/323; 15/410; 55/369; 55/379; 55/DIG. 3
[58] Field of Search ................. 55/357, 365, 369, 378, 55/379, 374, DIG. 2, DIG. 3; 15/350, 323, 410

[56] References Cited

U.S. PATENT DOCUMENTS

| | | | |
|---|---|---|---|
| 1,936,761 | 11/1933 | Hoover | 15/323 X |
| 2,037,668 | 4/1936 | Smith et al. | 15/323 X |
| 2,073,489 | 3/1937 | Leathers | 55/369 X |
| 2,083,914 | 6/1937 | Leathers | 55/357 |
| 2,639,456 | 5/1953 | Smith | 15/323 X |
| 2,747,683 | 5/1956 | Ziegler, Jr. | 55/357 |
| 2,829,734 | 4/1958 | Brace | 55/365 X |
| 3,056,995 | 10/1962 | Tamarin et al. | 15/323 |
| 3,667,084 | 6/1972 | Valbona et al. | 15/323 |
| 4,349,361 | 9/1982 | Scott et al. | 55/357 |
| 4,566,884 | 1/1986 | Jones et al. | 55/357 |

Primary Examiner—Kathleen J. Prunner
Attorney, Agent, or Firm—Gerald H. Kreske; Richardson B. Farley

[57] ABSTRACT

The invention provides a resiliently mounted top cap for a cleaner bag that tends to urge a bag upwardly to tighten it. At the same time, the cap may be removed downwardly against its spring bias for shaking as a dirt loosening mechanism. The cap also includes an integral cord hook so that downward movement of it against its spring bias also provides a cord dump function.

8 Claims, 6 Drawing Figures

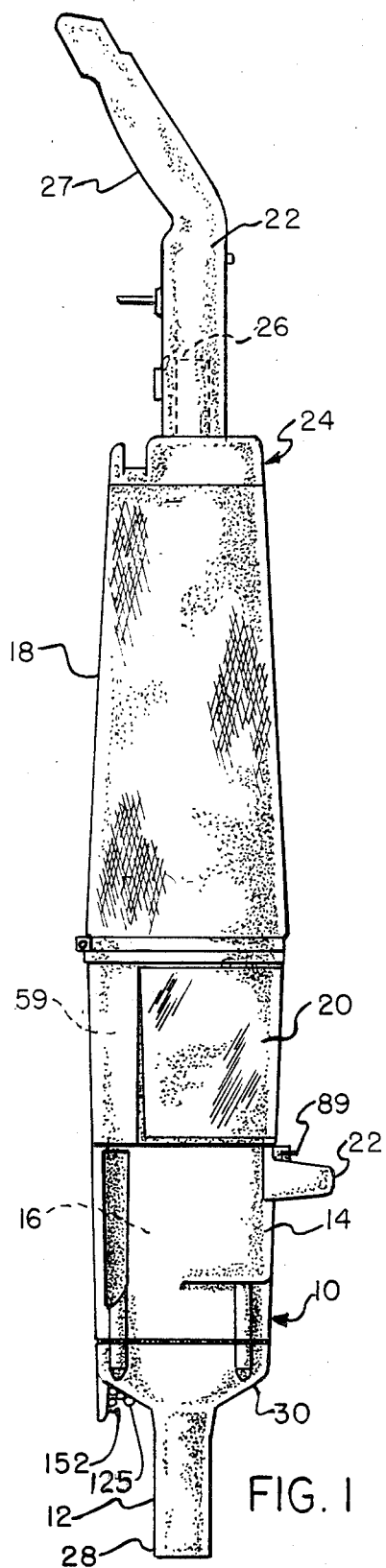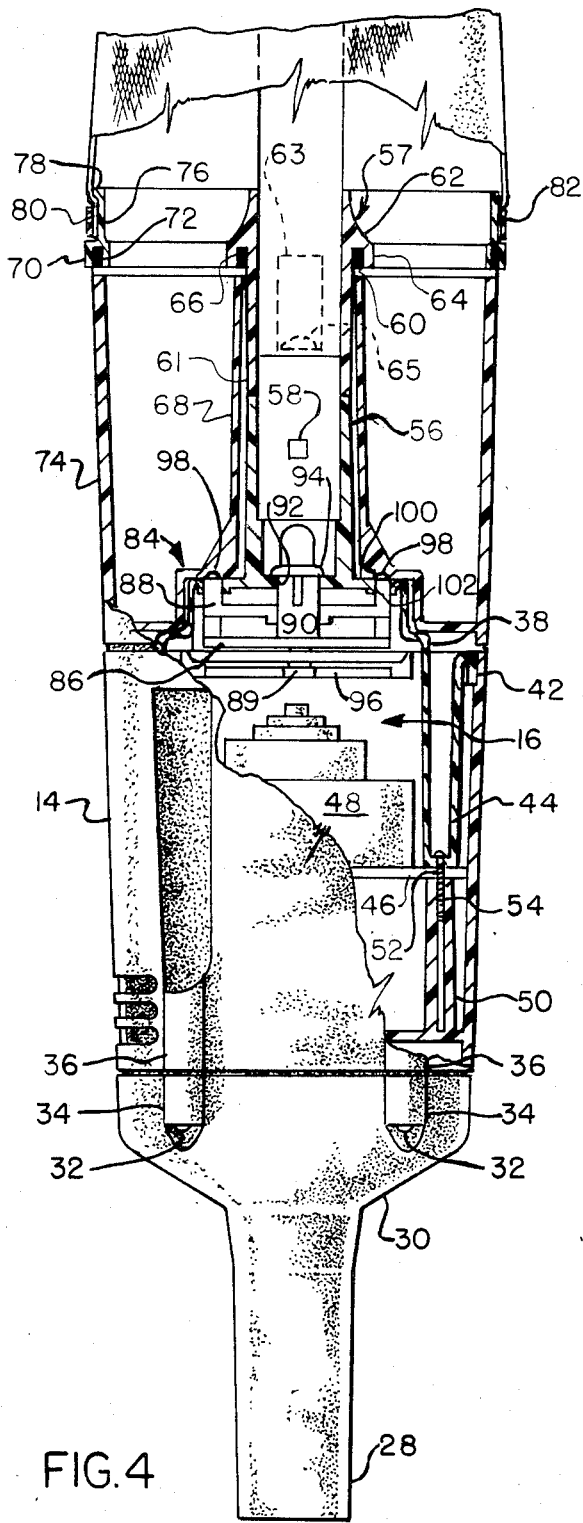
FIG. 1
FIG. 4

CORD DUMP AND BAG TENSIONING CAP

BACKGROUND OF THE INVENTION

1. Field of the Invention

This invention relates to floor care appliances and, more specifically, relates to a combined cord hook and resiliently mounted bag cap for an upright cleaner.

2. Summary of the Prior Art

Heretofore floor care appliances or the like have been provided with cord hooks for the storage of the electrical cord utilized with the appliance. These hooks have taken a variety of forms, from hooks rigidly mounted relative to the handle, to deformable hooks, to hooks resiliently mounted relative to the handle; these last two providing a cord dumping function. Also known are top bag caps, resiliently urged upwardly, to stretch the bag and selectively permit its collapse for dirt shakeout purposes. It is even old to form a combined unitary bag hanger and cord hook rigidly fixed relative to the handle of the floor care appliance. But, none of the advantages attendant to a combined resiliently mounted bag cap and cord hook are known in the prior art.

Accordingly, it is an advantage of the instant invention to resiliently mount a combined cord hook and bag cap on a floor care appliance.

It is a further advantage to make the cord hook and bag cap a unitary, integral structure so that this combination may be easily formed by molding.

It is a still further object of the inventor to provide a cord dump and bag tightening configuration in a combined manner.

SUMMARY OF THE INVENTION

The invention is provided advantageously on a floor care appliance commonly called a stick cleaner. This cleaner has a motor-fan system for the generation of a suction for dirt pick up purposes, with the dirt being separated from the air stream in a porous bag or the like, disposed above the motor-fan system. A dirt cap may be mounted intermediate the elements so that dirt is finally deposited in it for removal, conventionally, by dumping.

In order to deposit dirt in the cup that adheres to the porous bag, it is shaken to dislodge the dirt. This is occasioned by a resiliently mounted top bag cap that supports the bag at its upper end in a taut manner. It may be depressed against the resilient bias of the cap and then the bag tapped or shaken to loosen adhering dirt. This cap, effaciously, also includes as an integral part of it, a cord hook, this hook serving as the upper retention means for the cord utilized with the floor care appliance. Again, since the cap and integral hook may be moved against the resilient bias of the bag cap, the cord hook is provided with a cord dumping function to ease removal of the cord from the means that support it on the floor care appliance.

BRIEF DESCRIPTION OF THE DRAWINGS

Reference may now be had to the accompanying Drawings for a better understanding of the invention, both as to its organization and function, with the illustration being of a preferred embodiment, but being only exemplary, and in which:

FIG. 1 is an elevational view of a stick cleaner incorporating the invention;

FIG. 4 is a cross sectional view of the cleaner of FIG. 1 with certain parts broken away and the handle removed;

DETAILED DESCRIPTION OF THE DRAWING

Figures 5, 6:
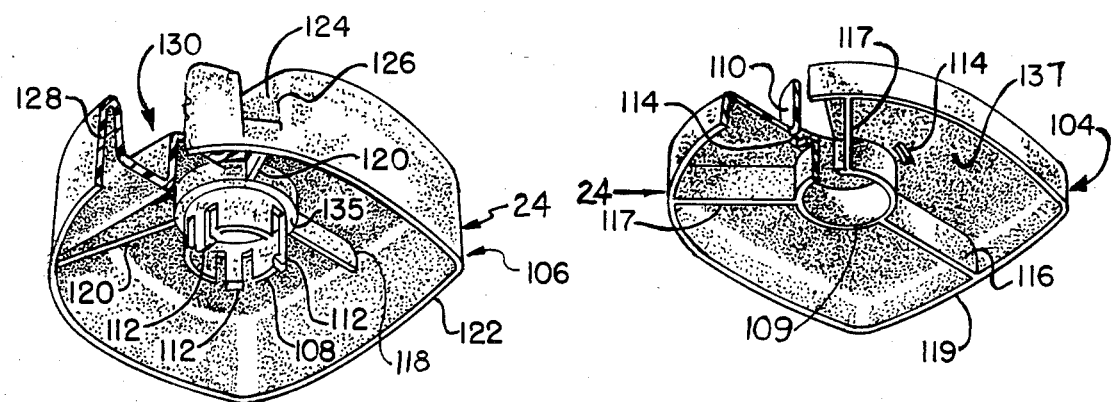
FIG. 5 is a perspective view of the inner cap member of the invention.
FIG. 6 is a perspective view of the outer cap member of the invention.

There is shown in FIG. 1, a floor care appliance 10 commonly called a stick cleaner having a suction tube snout 12, a motor housing 14 disposed above it and enclosing a motor-fan system 16. Mounted at the upper end of the cleaner is a porous bag 18, ideally made conventionally of cloth, and between it and the motor housing is lodged a dirt cup 20. The outer general configuration of the stick cleaner 10 may also include an intermediate transverse handle 22, a molded top bag cap 24, disposed at the top of the bag 18, and a handle 26 extending upwardly from the bag cap 24 and mounting a hand grip 27.

Turning to the remaining Figures in the Drawing, it can be seen that the suction tube snout 12 is formed with a suction tube extension 28 of tubular form which serves as a coupling arrangement for a nozzle or the like (not shown). The suction tube extension 28 merges smoothly into an integral fan housing section 30 having roughly an open funnel shape with its opening disposed upwardly. The fan housing section 30 is fixed to the motor housing 14 by a series of screws 32, 32 mounted in confronting bosses 34, 36 and 34, 36, with a stepped lip (not shown) between these two sections ensuring an airtight seal.

Motor housing 14 is connected to handle 26 by a motor cover 38 that seats inside the open upper end of motor housing 14. A stepped lip 42 on motor housing 14 ensures a tight seal between it and motor cover 38. Integral hollow legs 44 (only one shown) on motor cover 38 depend downwardly to abut against a motor frame support bracket 46 of motor 48 that is trapped between it and upwardly extending internally threaded leg 50, integral with motor housing 14. A screw 54 is inserted into hollow leg 44 and threaded into leg 50, passing through a screw hole 52 in motor lamination support bracket 46 to provide a connection between motor housing 14, motor cover 38 and motor 48 disposed therein. Motor cover 38 includes an integral, centrally disposed stem member 56 that takes the form of a hollows tubular upwardly extending portion that extends to the bottom of a bag support hollow tubular support 61 of bag support 57 for handle 26. The handle 26 extends downwardly and telescopes within the stem 56 and the hollow tubular support 61 and is attached to the stem member 56 through the use of a bolt or the like (not shown) extending through the stem member 56 and aligned attachment apertures 58 (only one shown) in handle 26.

The bag support 57 is attached to the stem member 56 by the use of a rearwardly disposed depending tube 63 (shown dashed in FIG. 4, of bag support 57) which is integral with it and includes a screw 65 that passes through its closed bottom and engages a lug (not shown) on the motor cover 38 that extends radially for this purpose.

The bag support 57 is fixed to the motor fan cover 38, by a depending portion 59 (FIG. 1) and includes an inner annular downwardly opening groove 60 formed by an inner upper, thickened portion 62 of generally conical shape having a downturned inner annular rim 64 spaced from the remainder of the thickened portion 62. This groove mounts an inner seal 66 of annular configuration that serves to seal the top of an inner shell side 68 of dirt cup 20. The bag support 57 of stem member 56 also includes an integral outer channel section 70, connected to the inner, annular molded ribbing or the like (not shown) annular in configuration and also downwardly opening, to receive an outer annular seal 72 for sealing an outer wall 74 of dirt cup 20. Thus, when the dirt cup 20 is abutted into engaging contact with the seals 66 and 72, the dirt cup 20 is sealed relative to the bag support 57 of stem member 56.

The bag support 57 also includes, integral with the channel section 70 and extending upwardly therefrom a rim 76 of annular configuration and having a bead 78 at its upper end. Lower reaches 80 of the porous bag 18 dependingly pass over the bead 78 and rim 76 and are trapped to the rim 76 by a conventional flanged clamping ring 82. Thus, the porous bag 18 is sealed in confluent relationship with the dirt cup 20 by the bag 18 being sealed to the bag support 57 of stem 56 and the dirt cup 20 also being sealed to this upper terminus.

In order to abuttingly contact the dirt cup against the seals 66 and 72 to provide the airtight connection necessary for the successful operation of floor care appliance 10, a camming arrangement 84, comprising a camming plate 86 and a cam follower 88 is included located at the bottom of the dirt cup 20. These members may have ramped confronting surfaces and may be detented (not shown) so that rotation of the camming plate 86 by means of an external lever 89 moves the cam follower 88 upwardly to cam the dirt cup 20 upwardly into sealing condition.

This is occasioned in the following manner: cam plate 86 includes an integral, centrally disposed axle 90 that extends upwardly and snap fits into a bore 92 in a bottom of stem 56 by means of deformable tabs 94, 94. The cam plate 86 may then rotate relative to stem 56 with the tabs 94, 94 sliding on the bottom of the stem 56. Movement of the cam plate 86 swingably is through the aegis of the lever 89 that is integrally attached to the cam plate 86 by a depending arm or the like (not shown) that moves swingably along a slot 96 in motor housing 14. Through this movement, the cam follower 88 is urged upwardly so that three equally spaced pins 98, 98, (only two shown) integral with it extend, through an integral flange 100 on the bottom of the stem 56 that extends outwardly, annularly around it and serves as a loading platform for the dirt cup. As the pins 98, 98 are forced through three bores 102, 102 (only two shown) in the integral flange 100 they contact the bottom of the dirt cup 20 and force it into sealing engagement with the seals 66 and 72 to seal it to the porous bag 18. The dirt cup 20 may be removed by rotating the cam plate 86 so that the pins 98, 98 withdraw into the bores 102, 102 thereby freeing the dirt cup for removal from the floor care appliance 10. No further description of the camming arrangement for the dirt cup 20 will be offered since this is not considered one of the inventive aspects of this Application.

The flow of suction air through the suction tube extension 28 also forms no part of this invention and is occasioned, conventionally, by a fan disposed at the bottom of the cleaner which drives air along its side past the dirt cup through the passage through depending portion 59 for exhaust to the cloth bag disposed above the dirt cup. Such a conventional configuration, for example, is shown as old in U.S. Pat. Nos. 2,187,164 and 2,210,724.

The inventive aspects of this structure will now be detailed. Top bag cap 24 is comprised of inner and outer cap members 104, 106, with the outer cap member 106 generally of the shape of a downturned oblong cup with a hollow, central, cylindrically axially extending, somewhat intermittent bearing member 108 integral therewith within the cup shape. The inner cup member 104 also is in the form of a downwardly turned oblong cup and has a hollow, centrally located, cylindrical, axially extending, depending bearing member 109 and also includes a hollow, upwardly, hollow, cylindrical, axially extending bearing member 110 that is disposed around the intermittent bearing member 108 when the end cap 24 is assembled. This assemblage is maintained by hooked prongs 112, 112, 112, formed as a part of intermittent bearing member 108 and equally spaced therearound that extend through equally spaced slots 114, 114, 114 in inner cap member 104 which in assembled position is below it. Inner cap member 104 also includes a series of three, equally spaced, radial integral strengthening ribs 116, 117 and 117 that extend to a border wall 119 in depending fashion within the cup shape of inner cap member 104.

Outer cap member 106 also includes a series of three integral, equally spaced, radially extending ribs 118, 120 and 120, with the rib 118 extending to a border wall 122 of the cap shape of outer cap member 106. The ribs 120, 120 are somewhat truncated in that they terminate short of the border wall 122 at an inner wall 126 of a grooved depression 124, formed in the upper surface of the cap member 106. It extends across the cap member 106 to form a depression and a retention means for the reception of an electric cord 125 of the floor care appliance 10 when it is mounted thereon. Bordering the trough or grooved depression 124 is also an outer wall 128 which, with the inner wall 126 form the trough 125 to provide the equivalent of a cord hook or means for core retention 130.

Inner cap member 104 utilizes the inner, centrally located hollow boss 109 to extend within the upper reaches of the bag as to be disposed around the handle 26 in a somewhat loose manner. Since the inner and outer cap members 104, 106 are assembled by means of the engaging prongs 112, 112, 112, the telescopic reception of the hollow boss 109 on handle 26 mounts the cap member 24 with the handle 26.

A gasket 134 of hollow annular configuration is disposed above hollow boss 109, within intermittent bearing member 108 of outer cap member 106, around handle 26, with this gasket affecting a seal at its top against a sealing face 135 of outer cap member 106, and at its bottom against a top surface 137 of inner cap member 104 and an outer cylindrical periphery of handle 26. This gasket is not so tightly disposed about the handle 26 that it cannot move axially thereon.

An upper reach 136 of porous bag 18 is trapped between the inner and outer cap members 104, 106 by reason of its having a radially inturned shape and a hole 138 sufficiently large to pass over the bearing member 110 of inner cap member 104 but still smaller than the total outer periphery of the cap member 104. It is assembled on inner cap member 104 before this cap member is associated with outer cap member 106.

It should be obvious, then, that taughtness of the porous bag 18 can be occasioned by a tendency for movement of the top bag cap 24 away from the bag clamping ring 82. Such movement occurs because of the imposition of a coiled compression spring 140 telescopically around handle 26. This spring is compressed between a through pin 142, passing through the handle 26, and a bottom side 144 of hollow depending boss 109 of inner cap member 104. Such spring compression urges the top bag cap 106 and, with it, upper reach 136 of the bag upwardly.

Figures 2, 3:
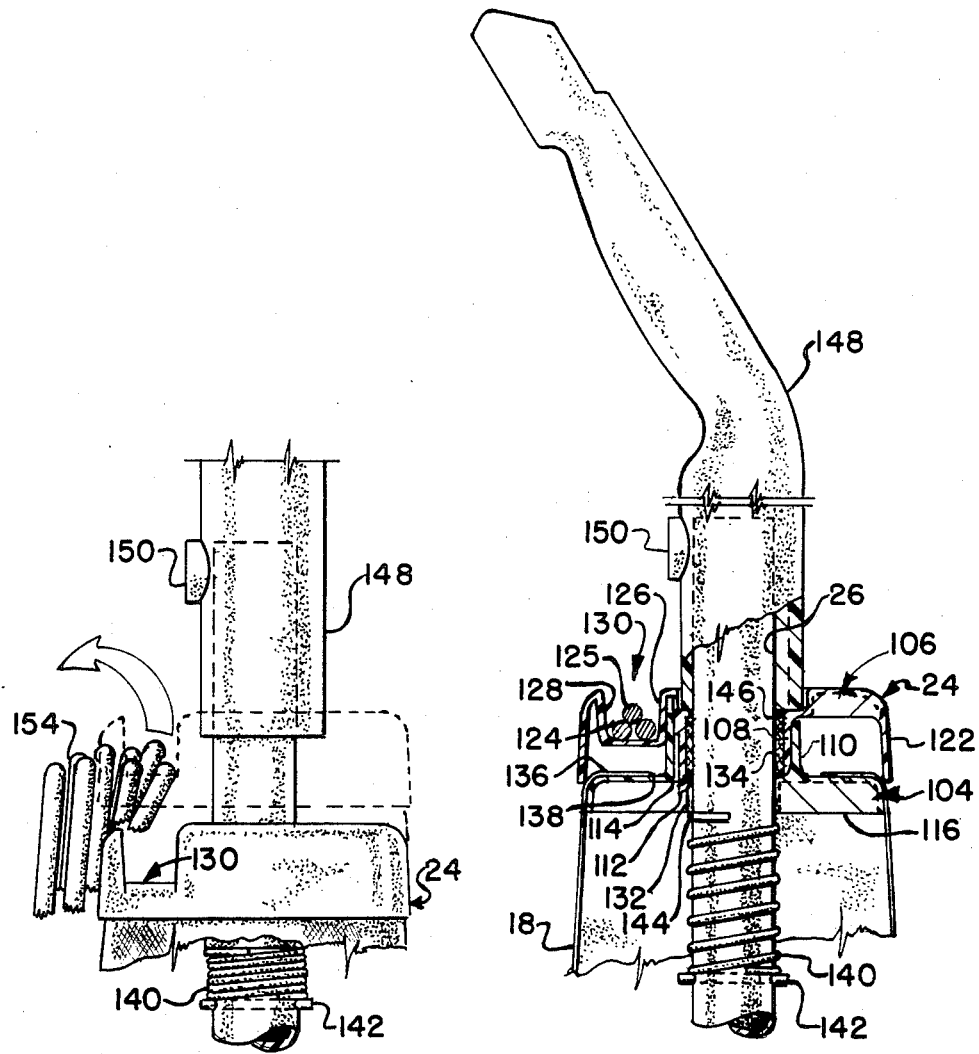
FIG. 2 is a cross sectional view of the top cap and related structure of the invention.
FIG. 3 is an elevation view of the structure of FIG. 2 with the bag broken away and showing two positions of the bag cap.

The outer bag cap 106 (top bag cap 24) is limited in its upward movement by a bottom side 146 of a hand grip 148, with this hand grip fixed to handle 26 by a fastener such as a counter sunk bolt and nut 150. This position of the top bag cap 24 is illustrated in FIG. 2. The bag cap 24 is limited in its downward movement by, essentially, the compressed stack height of the coiled compression spring 140. Such a position is shown in FIG. 3.

The suction tube snout 12 includes a means for cord retention or hook 152, integral therewith, and shaped much like the hook means 130 on the top bag cap 24. The electrical cord 125 can be wound around the hook means 130, 152, to form a coil 154 as is conventional in the cleaner art. The cord 125 may, then, be easily removed from its coiled state on these two hooks by depressing the top bag cap 24 and its integral hook means 130 to remove tension from the coil 154 permitting the electrical cord 125 to easily be removed from the hooks 130, 152.

The resiliently deformable top bag cap 24 also serves another useful purpose. When shakeout of porous bag 18 is desired, top bag cap 24 is depressed and, if need be, the porous bag 18 is tapped while in collapsed condition to free dirt adhering to its inner side. Thus, the resiliently mounted top bag cap unobviously serves a dual function.

It should be clear from a perusal of the foregoing description that the invention fully meets the advantages set out for it. It should also be clear that many modifications to the structure would obviously occur to one skilled in the art which would still fall within the spirit of the invention described.

What is claimed is:

1. A cleaner having a bag and including:
   (a) a means for tautening said bag, resiliently urged for stretching said bag, and
   (b) a cord hook mounted with said bag tautening means,
   (c) whereby movement of said bag tautening means against said resilient urging provides a cord dump function for said cleaner.
2. The cleaner structure of claim 1 wherein:
   (a) said tautening means comprises a top cap for said bag,
   (b) said top cap having said cord hook formed as an integral hook means for storage of said cord.
3. The cleaner structure of claim 2 wherein:
   (a) said resilient urging tends to move said top cap upwardly relative to said cleaner, and
   (b) a hand grip on said cleaner limits said upward movement.
4. The cleaner structure of claim 2 wherein:
   (a) said integral hook means is formed by a trough molded in said top cap.
5. The cleaner structure of claim 1 wherein:
   (a) said tautening means comprises a top cap for said bag,
   (b) said top cap being formed from at least two pieces,
   (c) said bag having an upper reach, and
   (d) said upper reach being disposed between said pieces.
6. The cleaner structure of claim 5 wherein:
   (a) one of said pieces includes a hollow boss telescopically received on a handle of said cleaner,
   (b) said upper reach of said bag including a hole larger than said boss and smaller than the other piece.
7. The cleaner structure of claim 5 wherein:
   (a) said pieces are snap fit together.
8. The cleaner structure of claim 5 wherein:
   (a) a gasket is disposed between said pieces.

* * * * *